(12) United States Patent
Shin et al.

(10) Patent No.: US 9,381,864 B2
(45) Date of Patent: Jul. 5, 2016

(54) PANELLESS CARGO SCREEN AND VEHICLE HAVING THE SAME

(71) Applicant: Hyundai Motor Company, Seoul (KR)

(72) Inventors: Hyoung Shin, Yongin-si (KR); Yong Chae Kim, Suwon-si (KR); Jin Seok Yoon, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/570,780

(22) Filed: Dec. 15, 2014

(65) Prior Publication Data

US 2015/0343954 A1   Dec. 3, 2015

(30) Foreign Application Priority Data

May 29, 2014   (KR) .......................... 10-2014-0065018

(51) Int. Cl.
 *B60R 5/04*   (2006.01)
 *B62D 25/08*   (2006.01)

(52) U.S. Cl.
 CPC ................. *B60R 5/047* (2013.01); *B60R 5/045* (2013.01); *B62D 25/087* (2013.01)

(58) Field of Classification Search
 CPC ....... B60R 5/044; B60R 5/047; B62D 25/087
 USPC ............... 296/37.16, 100.01, 100.12, 100.15, 296/100.16, 136.03
 See application file for complete search history.

(56) References Cited

U.S. PATENT DOCUMENTS

| | | | | |
|---|---|---|---|---|
| 5,727,836 A | * | 3/1998 | Hosoya | .................... B60R 5/047 296/37.1 |
| 6,213,186 B1 | * | 4/2001 | Torres | .................... B60J 1/2038 160/24 |
| 7,481,478 B2 | | 1/2009 | Cho et al. | |

FOREIGN PATENT DOCUMENTS

| | | |
|---|---|---|
| KR | 10-2007-0035634 A | 4/2007 |
| KR | 10-0772330 B1 | 10/2007 |
| KR | 10-0845716 B1 | 7/2008 |
| KR | 10-0872341 B1 | 12/2008 |
| KR | 10-2012-0016851 A | 2/2012 |
| KR | 10-1180647 B1 | 9/2012 |

* cited by examiner

*Primary Examiner* — Jason S Daniels
(74) *Attorney, Agent, or Firm* — Morgan, Lewis & Bockius LLP

(57) ABSTRACT

A cargo screen device for a vehicle may include a housing unit which has a screen drawing groove, and a screen unit which includes a screen member that may be wound in the housing unit, or deployed from the housing unit through the screen drawing groove, wherein the screen unit includes a wire member which may be made of a flexible material, and coupled to the screen member along a tip of the screen member.

9 Claims, 3 Drawing Sheets

PANELLESS CARGO SCREEN AND VEHICLE HAVING THE SAME

CROSS-REFERENCE TO RELATED APPLICATION

The present application claims priority to Korean Patent Application No. 10-2014-0065018 filed on May 29, 2014, the entire contents of which is incorporated herein for all purposes by this reference.

BACKGROUND OF THE INVENTION

1. Field of the Invention

The present disclosure relates to a technology associated with a cargo screen. More particularly, it relates to a technology that provides a screen that is positioned in a luggage room of a vehicle, thereby preventing a luggage room portion from being exposed to the outside.

2. Description of Related Art

In the case of a van type vehicle or a general recreational vehicle (RV vehicle), a luggage room portion is formed at a rear side of a rear seat, and luggage may be stored in the luggage room portion. However, in the case of the van type vehicle or the recreational vehicle (RV vehicle), the luggage room portion has an open structure that is connected with the interior of the vehicle. Therefore, the luggage room portion inside the vehicle is/are seen from the outside.

Therefore, in the case of the vehicle including the luggage room, there is a risk that the luggage may be stolen when the stored luggage is exposed to the outside, and there is a risk that the luggage may be damaged due to the movement of the vehicle when the stored luggage is not fixed.

For this reason, in the case of the van type vehicle or the recreational vehicle (RV vehicle), which includes the luggage room, the luggage room inside the vehicle may be covered by a cargo screen so as not to be seen from the outside. Furthermore, in a case in which luggage is stored in the luggage room, the movement of the stored luggage may be minimized by the cargo screen, thereby reducing damage to the luggage. Therefore, the cargo screen is configured to be fixed to a door holder portion in the luggage room to shield the stored luggage when the cargo screen fixed to a side trim of the vehicle is deployed.

FIG. 2 illustrates a configuration of a cargo screen that is currently applied. A general cargo screen includes a housing unit, and a screen unit, and the screen unit includes a screen member for blocking the interior of the vehicle from being seen, and a panel member which is provided with a knob. In the case of the panel member having the knob, there is a problem in that the panel member may not enter the housing unit but protrude when the cargo screen is not deployed.

As a related art, Korean Patent No. 10-1180647 describes a cargo screen assembly for a vehicle in which a guide groove for a screen is formed, such that when the screen enters a housing unit, a screen member may enter the housing unit while sliding along the guide groove.

However, even in the Korean Patent No. 10-1180647, there is a problem in that a part of the cargo screen protrudes in a luggage room when the cargo screen is wound.

In the case of a cargo screen that is used, a knob portion of the cargo screen is configured as a panel member, and as a result, the knob portion is configured to be used by being connected with a luggage room door, but the knob portion does not enter a housing unit because a thickness of the knob portion is greater than that of a general screen member. Therefore, a part of the cargo screen protrudes in a storage container portion in a traveling state in which the cargo screen is not deployed, and as a result, there is a problem in that a storage capacity of a luggage room is reduced.

Furthermore, even in a case in which the cargo screen is detached, the knob panel portion is not wound in the housing unit but protrudes because a thickness of the knob panel portion is greater than that of the screen, such that an additional space for the protruding knob panel portion is required when the cargo screen is stored.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

The present invention has been made in an effort to solve the problem that a wide space is required for the protruding portion when the cargo screen is separately stored, by reducing the additional protruding portion when the cargo screen is wound in the housing unit, and by minimizing the reduction in storage capacity of the luggage room.

In an aspect of the present invention, a cargo screen device for a vehicle, may include a housing unit which may have a screen drawing groove, and a screen unit which may include a screen member that is wound in the housing unit, or deployed from the housing unit through the screen drawing groove, wherein the screen unit may include a wire member which is made of a flexible material, and coupled to the screen member along a tip of the screen member.

The screen unit may include a pair of protruding members which is attached to both ends of the wire member, and may have a width that is greater than a width of the drawing groove of the housing unit.

The screen member may include a central region to which the wire member is coupled, and two edge regions which are disposed at left and right sides of the central region, and screen guide members which are formed along boundaries between the two edge regions.

The housing unit may include at least one rotation shaft member that is connected with one side tip of the screen member.

The housing unit may include a first rotation shaft member, and a second rotation shaft member, and the first rotation shaft member is configured to be rotated together with the second rotation shaft member after being independently rotated at a predetermined angle.

The first rotation shaft member may have a cylindrical shape, and may include a rotary projection at a side thereof, the second rotation shaft member may have a cylindrical shape including an insertion hole through which the first rotation shaft member is inserted into the second rotation shaft member, the second rotation shaft member may include a guide groove which accommodates the rotary projection of the first rotation shaft member, and the projection is formed to be moved in the guide groove in accordance with a rotation of the first rotation shaft member.

The screen guide member is configured by sewing.

In another aspect of the present invention, a vehicle including a luggage room, may include a vehicle main body, and a cargo screen device which is fixed to the vehicle main body, wherein the cargo screen device may include a housing unit which may have a screen drawing groove, and a screen unit which may include a screen member that is wound in the housing unit, or deployed from the housing unit through the screen drawing groove, and a wire member which is made of a flexible material, and coupled to the screen member along a tip of the screen member.

The screen unit may include a pair of protruding members which is attached to both ends of the wire member, and may have a width that is greater than a width of the drawing groove of the housing unit.

The screen member may include a central region to which the wire member is coupled, and two edge regions which are disposed at left and right sides of the central region, and screen guide members which are formed along boundaries between the two regions.

The housing unit may include at least one rotation shaft member that is connected with one side tip of the screen member.

The housing unit may include a first rotation shaft member, and a second rotation shaft member, and the first rotation shaft member is configured to be rotated together with the second rotation shaft member after being independently rotated at a predetermined angle.

The first rotation shaft member may have a cylindrical shape, and may include a rotary projection at a side thereof, the second rotation shaft member may have a cylindrical shape including an insertion hole through which the first rotation shaft member is inserted into the second rotation shaft member, the second rotation shaft member may include a guide groove which accommodates the rotary projection of the first rotation shaft member, and the rotary projection is formed to be moved in the guide groove in accordance with a rotation of the first rotation shaft member.

By the aforementioned configuration, the present invention minimizes the protruding portion when the cargo screen is wound, thereby solving the problem that the storage capacity for the existing cargo screen is reduced. Furthermore, the present invention provides a technology that significantly reduces a space that is required when the cargo screen is separately mounted.

The present invention may reduce a thickness of the screen member by providing the screen unit including the wire member, and provides economic efficiency in that the screen member may be manufactured to have a more simple structure by reducing a thickness of the screen member compared to the existing structure. Accordingly, the present invention may reduce a weight of the cargo screen mounted in the vehicle, thereby also providing improvement in fuel efficiency.

Finally, since the wire member made of a flexible material has a high degree of freedom, the cargo screen may be widely used regardless of design of a rear door portion and a panel portion of the vehicle and the types of vehicles.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the invention are discussed infra.

Figure 1:
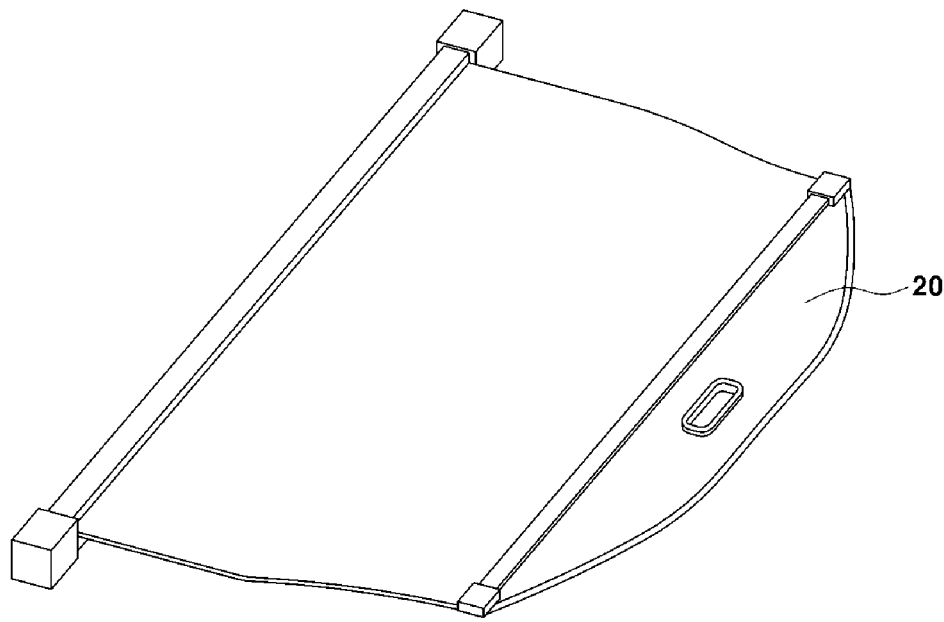
FIG. 1 is a deployment view of a cargo screen that is currently used, and illustrates a knob portion that is configured as a panel.

Reference numerals set forth in the Drawings includes reference to the following elements as further discussed below, It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment of a panelless cargo screen of the present invention will be described in detail with reference to the accompanying drawings.

However, in an exemplary embodiment of the present invention, a configuration of a guide member of a screen, a position where a cargo screen is attached, the number of rotation shaft members, and a shape of the rotation shaft member are not limited to the description disclosed in the following exemplary embodiment, and it should be construed that the scope of the present invention affects the scope equivalent to the present invention.

In a van type vehicle or a recreational vehicle (RV vehicle) in which a luggage room is connected with the interior of the vehicle, a cargo screen is used to block the luggage room from being seen from the outside, and to shield stored luggage.

However, as illustrated in FIG. 1, a knob member has a panel 20, and as a result, when the cargo screen is not deployed, the panel of the knob member does not enter a housing unit, but protrudes.

Figure 2:
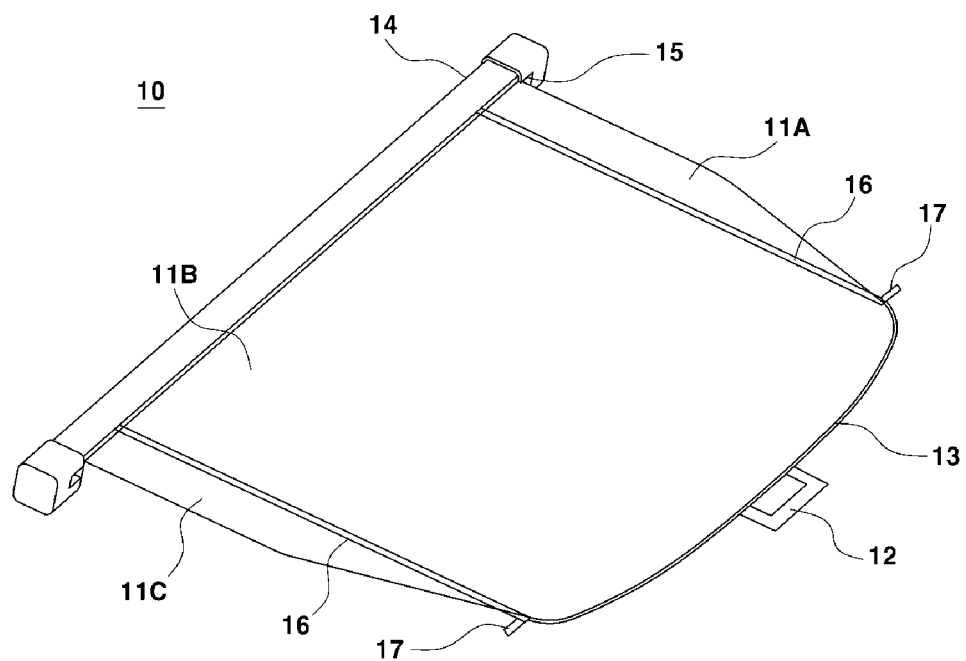
FIG. 2 illustrates a configuration in a state in which a cargo screen of the present invention is deployed.

Therefore, to minimize the protruding portion, the present invention provides a cargo screen 10 which includes a housing unit 14, a screen unit 11, and a knob member 12, as illustrated in FIG. 2.

In addition, in an exemplary embodiment of the present invention, the screen unit includes a screen member 11, a wire member 13, protruding members 17, and screen guide members 16, and the screen member needs to be made of a semi-transparent material, such that polyester (PE) may be used. Therefore, the screen unit serves to block the luggage room from being seen from the outside.

Furthermore, the screen member may have a bellows structure, and the screen member may have a structure that may be any shape as long as the screen maintains horizontality in a state in which the cargo screen is deployed.

The screen guide members 16 serve to prevent the panelless screen from sagging when the panelless screen is deployed, and reinforce rigidity. The screen member includes a central region in which the wire member is coupled, two edge regions which are disposed at the left and right sides of the central region, and a screen guide member which is formed along a boundary between the two regions. The screen guide member may be configured by sewing.

In the present exemplary embodiment, the configuration of the screen member will be divided into a second zone 11B that is the central region, and a first zone 11A and a third zone 11c that are two edge regions disposed at the left and right sides of the central region, and described with reference to rotation shaft members, which will be described below. The screen guide members are fixed with the wire member of the cargo screen, and perform the aforementioned functions.

The wire member, which is made of a flexible material, is coupled to the screen member along a tip of the screen member, and more particularly, the wire member may be a piano wire. Furthermore, the wire member may be coupled to the screen member by sewing.

The housing unit 14 of the cargo screen includes one or more central shaft members 210 and 220 which are connected to ends of the screen, a drawing groove 15 for the screen member, and an elastic spring member such as a spring which is connected to the central shaft at the inner side thereof, but is not illustrated.

Figure 3:
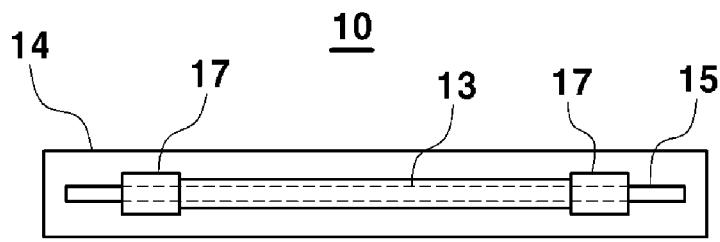
FIG. 3 illustrates a front view of a drawing groove of a housing unit and a wire member in a state in which the cargo screen in an exemplary embodiment of the present invention is wound.

FIG. 3 illustrates the configurations of the drawing groove 15 of the housing unit 14 and the wire member 13 when the cargo screen is wound (see FIG. 5A), when viewed from the front side thereof. The wire member may have a width greater than a width of the drawing groove of the housing unit. However, in a case in which the wire member has a width that is equal to or smaller than a width of the drawing groove of the housing unit, the protruding member of the screen unit necessarily has a width that is greater than a width of the drawing groove of the housing unit.

In the exemplary embodiment of the present invention, the flexible wire member may be extended to both sides in a state parallel to the housing unit when the screen enters the housing unit, and the protruding member attached to the screen maintains a width that is greater than a width of the drawing groove of the housing unit, such that the protruding member may protrude to the outside as large as an area of the wire member in a state in which the cargo screen enters the housing unit.

The housing unit includes the rotation shaft members, and the rotation shaft members may include a first rotation shaft member 210 and a second rotation shaft member 220. The first rotation shaft member 210 may be independently rotated at a predetermined angle, and thereafter, may be rotated together with the second rotation shaft member 220.

The first rotation shaft member may have a cylindrical shape, and include a rotary projection 230 at a side thereof, and the second rotation shaft member may have a cylindrical shape that includes an insertion hole through which the first rotation shaft member is inserted into the second rotation shaft member.

The second rotation shaft member includes a guide groove 240 which accommodates the rotary projection of the first rotation shaft member, and the projection may be formed to be moved in the guide groove in accordance with the rotation of the first rotation shaft member.

Figure 4:
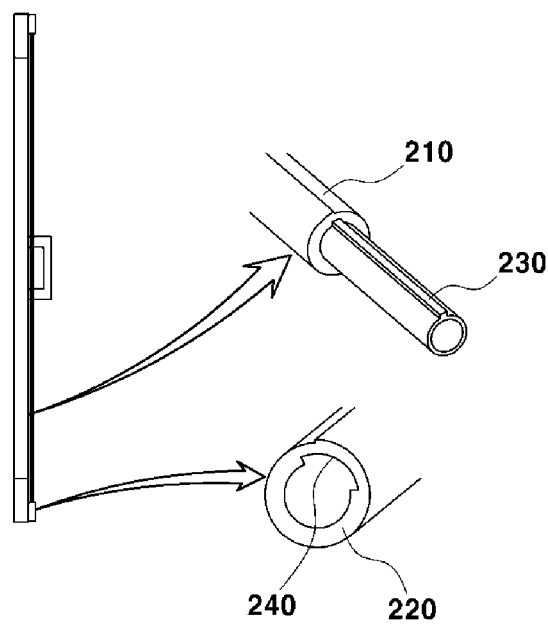
FIG. 4 illustrates two rotation shaft members that are configured in the housing unit of the present invention.

FIG. 4 illustrates the rotation shaft members 210 and 220 that are positioned in the housing unit, and in the present exemplary embodiment, there are two rotation shaft members. The screen member is divided into three zones, a second zone screen member is connected with the first rotation shaft 210, and first and third zone screen members are connected with the second rotation shaft 220, respectively. The first rotation shaft and the second rotation shaft may be tensioned by a single spring member, and include one or more spring members.

Hereinafter, an operation of the cargo screen of the exemplary embodiment will be described step-by-step with reference to FIGS. 5 and 6, and operations of the two rotation shaft members according to the deployment of the cargo screen will be described.

Figure 5A:
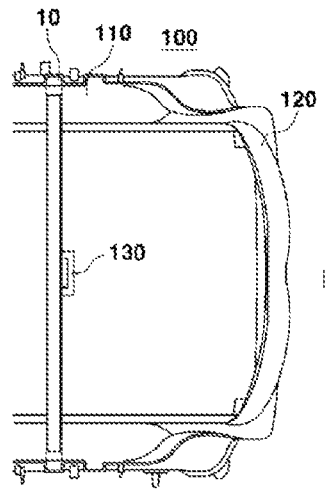
FIG. 5A illustrates operating steps when the cargo screen of the present invention is deployed.

FIG. 5 is a view illustrating steps when the cargo screen is deployed from a state in which the cargo screen is wound. FIG. 5A illustrates an operational process that is applied to a vehicle 100 when the cargo screen is wound, the cargo screen is fixed to a luggage room side trim 110 of the vehicle, and in the case of the cargo screen that is unwound by tensile force by the spring member, the wire member is parallel to the fixed housing unit.

The wire member may have a predetermined curvature when the cargo screen is deployed, which may be implemented by a flexible material. The state in which the wire member and the housing unit are parallel to each other may be maintained by tensile force by the spring member inside the housing unit.

Figure 6A:
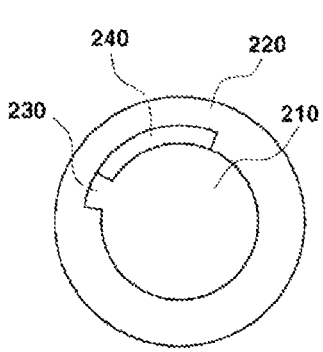
FIG. 6A illustrates operating steps when the two rotation shaft members, which are configured in the housing unit of the present invention, are deployed.

FIG. 6A illustrates a step when the cargo screen begins to be deployed from a state in which the cargo screen is wound in the housing unit, and corresponds to FIG. 5A, and the rotary projection 230 of the first rotation shaft member is moved along the guide groove 240 in the second rotation shaft member. That is, the second rotation shaft member is not rotated while the rotary projection 230 of the first rotation shaft member is moved in the guide groove 240 portion of the second rotation shaft member. As described above, an operation before the rotary projection 230 comes into contact with any one surface of the guide groove 240 of the second rotation shaft member and the second rotation shaft member is rotated is illustrated.

Figure 5B:
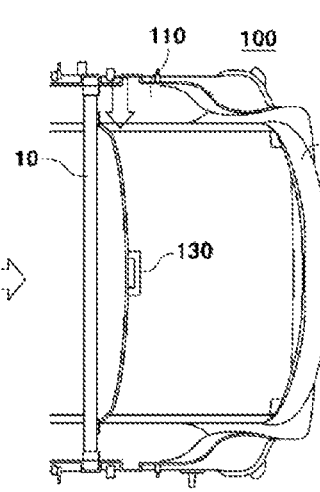
FIG. 5B illustrates operating steps when the cargo screen of the present invention is deployed.

FIG. 5B illustrates an intermediate step when the cargo screen of the present invention is deployed. As illustrated in the drawing, the wire member made of a flexible material is deformed to a shape having a curvature while both sides of the screen are contracted from a state in which the wire member is parallel to the housing unit.

Figure 6B:
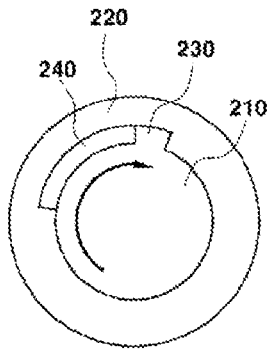
FIG. 6B illustrates operating steps when the two rotation shaft members, which are configured in the housing unit of the present invention, are deployed.

FIG. 6B illustrates the moment when the rotary projection 230 of the first rotation shaft member comes into contact with one surface of the guide groove 240 of the second rotation shaft member. This operation is an operation of the rotation shaft that corresponds to the deployment step illustrated in FIG. 5B. Therefore, as illustrated in the drawing, the first rotation shaft member and the second rotation shaft member simultaneously begin to be rotated. Therefore, the second zone of the screen member is deployed for a slightly longer period of time compared to the first and third zones.

Figure 5C:
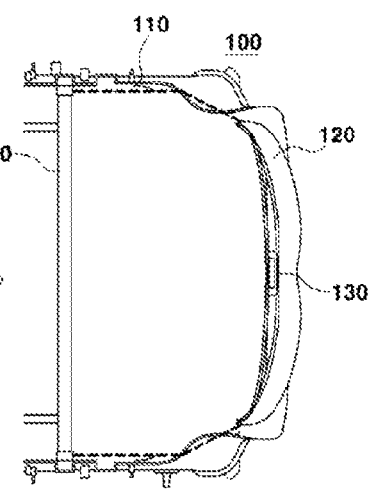
FIG. 5C illustrates operating steps when the cargo screen of the present invention is deployed.

FIG. 5C illustrates a state in which the cargo screen is completely deployed. The wire member of the deployed screen unit may have a curvature according to a rear end of the luggage room. In addition, a knob member 130 may be mounted on a door 120 or a predetermined portion at a rear end of the luggage room.

Figure 6C:
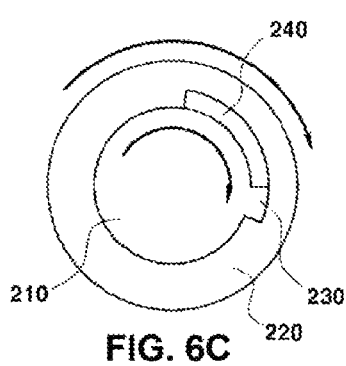
FIG. 6C illustrates operating steps when the two rotation shaft members, which are configured in the housing unit of the present invention, are deployed.

FIG. 6C corresponds to FIG. 5C, and illustrates a state in which the screen is completely deployed by the rotation of the first rotation shaft member and the second rotation shaft member.

On the contrary, in the step in which the screen member enters the housing unit, the second zone of the screen member is tensioned by the spring member for a slightly longer period of time compared to the first and third zones. Therefore, when the screen member enters the housing unit, the wire member of the screen unit, which is connected to the first rotation shaft member, may provide additional tension to maintain equilibrium with the housing unit. Accordingly, the wire member may be maintained to be parallel to the housing unit in a state in which the cargo screen is unwound.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cargo screen device for a vehicle, comprising:
a housing unit which has a screen drawing groove; and
a screen unit which includes a screen member that is wound in the housing unit, or deployed from the housing unit through the screen drawing groove,
wherein the screen unit includes a wire member which is made of a flexible material, and coupled to the screen member along a tip of the screen member,
wherein the housing unit includes at least one rotation shaft member that is connected with one side tip of the screen member, and
wherein the housing unit includes a first rotation shaft member, and a second rotation shaft member, and the first rotation shaft member is configured to be rotated together with the second rotation shaft member after being independently rotated at a predetermined angle.

2. The cargo screen device of claim 1, wherein the screen unit includes a pair of protruding members which is attached to both ends of the wire member, and has a width that is greater than a width of the drawing groove of the housing unit.

3. The cargo screen device of claim 1, wherein the screen member includes:
a central region to which the wire member is coupled; and
two edge regions which are disposed at left and right sides of the central region, and screen guide members which are formed along a boundary between each edge region and an adjoining central region.

4. The cargo screen device of claim 1, wherein the first rotation shaft member has a cylindrical shape, and includes a rotary projection at a side thereof, the second rotation shaft member has a cylindrical shape including an insertion hole through which the first rotation shaft member is inserted into the second rotation shaft member, the second rotation shaft member includes a guide groove which accommodates the rotary projection of the first rotation shaft member, and the projection is formed to be moved in the guide groove in accordance with a rotation of the first rotation shaft member.

5. The cargo screen device of claim 3, wherein the screen guide member is configured by sewing.

6. A vehicle including a luggage room, comprising:
a vehicle main body; and
a cargo screen device which is fixed to the vehicle main body,
wherein the cargo screen device includes:
a housing unit which has a screen drawing groove; and
a screen unit which includes:
a screen member that is wound in the housing unit, or deployed from the housing unit through the screen drawing groove; and
a wire member which is made of a flexible material, and coupled to the screen member along a tip of the screen member;
wherein the housing unit includes at least one rotation shaft member that is connected with one side tip of the screen member, and
wherein the housing unit includes a first rotation shaft member, and a second rotation shaft member, and the first rotation shaft member is configured to be rotated together with the second rotation shaft member after being independently rotated at a predetermined angle.

7. The vehicle of claim 6, wherein the screen unit includes a pair of protruding members which is attached to both ends of the wire member, and has a width that is greater than a width of the drawing groove of the housing unit.

8. The vehicle of claim 6, wherein the screen member includes:
a central region to which the wire member is coupled; and
two edge regions which are disposed at left and right sides of the central region, and screen guide members which are formed along a boundary between each edge region and an adjoining central region.

9. The vehicle of claim 6, wherein the first rotation shaft member has a cylindrical shape, and includes a rotary projection at a side thereof, the second rotation shaft member has a cylindrical shape including an insertion hole through which the first rotation shaft member is inserted into the second rotation shaft member, the second rotation shaft member includes a guide groove which accommodates the rotary projection of the first rotation shaft member, and the rotary projection is formed to be moved in the guide groove in accordance with a rotation of the first rotation shaft member.

* * * * *